US012620053B2

(12) United States Patent
Gong

(10) Patent No.: US 12,620,053 B2
(45) Date of Patent: May 5, 2026

(54) IMAGE PROCESSING METHOD AND APPARATUS, MEDIUM, DEVICE AND DRIVING SYSTEM

(71) Applicant: Momenta (Suzhou) Technology Co., Ltd., Suzhou City (CN)

(72) Inventor: Jun Gong, Suzhou City (CN)

(73) Assignee: Momenta (Suzhou) Technology Co., Ltd., Suzhou City (CN)

( * ) Notice: Subject to any disclaimer, the term of this patent is extended or adjusted under 35 U.S.C. 154(b) by 302 days.

(21) Appl. No.: 18/462,579

(22) Filed: Sep. 7, 2023

(65) Prior Publication Data

US 2023/0419442 A1     Dec. 28, 2023

Related U.S. Application Data

(63) Continuation of application No. PCT/CN2022/100666, filed on Jun. 23, 2022.

(30) Foreign Application Priority Data

Feb. 28, 2022     (CN) .......................... 202210185274.7

(51) Int. Cl.
G06T 3/40          (2024.01)
G06T 7/10          (2017.01)
G06T 7/70          (2017.01)

(52) U.S. Cl.
CPC .................. G06T 3/40 (2013.01); G06T 7/10 (2017.01); G06T 7/70 (2017.01);
(Continued)

(58) Field of Classification Search
CPC .... G06T 3/40; G06T 7/10; G06T 7/70; G06T 2207/20084; G06T 2207/20132;
(Continued)

(56) References Cited

U.S. PATENT DOCUMENTS

2021/0042535 A1*  2/2021  Abbott ...................... G06T 7/73
2021/0063200 A1*  3/2021  Kroepfl .............. G01C 21/3841
(Continued)

FOREIGN PATENT DOCUMENTS

CN     111178253 A     5/2020
CN     113705375 A     11/2021
CN     114255351 A     3/2022

OTHER PUBLICATIONS

Shahian Jahromi, Babak, Theja Tulabandhula, and Sabri Cetin. "Real-time hybrid multi-sensor fusion framework for perception in autonomous vehicles." Sensors 19.20 (2019): 4357. (Year: 2019).*
(Continued)

*Primary Examiner* — Henok Shiferaw
*Assistant Examiner* — Dion J Satcher
(74) *Attorney, Agent, or Firm* — JCIPRNET

(57)     ABSTRACT

The present disclosure provides an image processing method and apparatus, a system, a medium, a device and a driving system, which belong to the field of data processing technologies. The image processing method mainly includes: according to perception target features of each perception target feature class in a plurality of predetermined perception target feature classes, and a pixel requirement of a neural network image perception model corresponding to each perception target feature class in a plurality of predetermined neural network image perception models, performing corresponding adjustment to a current environmental image to obtain a plurality of current environmental feature images; by using the corresponding neural network image perception model, perceiving a perception target in each current environmental feature image to obtain a plurality of perception results; and fusing the plurality of perception results to obtain perception result data of the current envi-
(Continued)

According to perception target features of each perception target feature class in a plurality of predetermined perception target feature classes, and a pixel requirement of a neural network image perception model corresponding to each perception target feature class in a plurality of predetermined neural network image perception models, performing corresponding adjustment to a current environmental image to obtain a plurality of current environmental feature images.     S101

By using the corresponding neural network image perception model, perceiving a perception target in each current environmental feature image to obtain a plurality of perception results     S102

Fusing the plurality of perception results to obtain perception result data of the current environmental image.     S103 ronmental image. The present disclosure can improve perception accuracy.

11 Claims, 2 Drawing Sheets

(52) U.S. Cl.
CPC .............. *G06T 2207/20084* (2013.01); *G06T 2207/20132* (2013.01); *G06T 2207/30256* (2013.01); *G06T 2207/30261* (2013.01)

(58) Field of Classification Search
CPC  G06T 2207/30256; G06T 2207/30261; G06V 20/70; G06V 20/58; G06V 20/588; G06V 10/22; G06V 2201/07; G06V 10/809; G06N 3/045; G06N 3/08; G06F 18/241
USPC ........................................................ 382/103
See application file for complete search history.

(56) References Cited

U.S. PATENT DOCUMENTS

| | | | | |
|---|---|---|---|---|
| 2021/0150230 | A1* | 5/2021 | Smolyanskiy | ....... G06V 10/803 |
| 2021/0390288 | A1 | 12/2021 | Mittal et al. | |
| 2021/0406560 | A1* | 12/2021 | Park | ..................... G01S 13/862 |
| 2021/0406679 | A1* | 12/2021 | Wen | ........................ G06V 10/82 |
| 2022/0092317 | A1* | 3/2022 | Yang | ......................... G06T 5/60 |
| 2023/0075493 | A1* | 3/2023 | Kabkab | ............... G06V 20/582 |

OTHER PUBLICATIONS

China Patent Office, International Search Report, Application No. PCT/CN2022/100666, mailed Oct. 8, 2022, 5 pages.

* cited by examiner

According to perception target features of each perception target feature class in a plurality of predetermined perception target feature classes, and a pixel requirement of a neural network image perception model corresponding to each perception target feature class in a plurality of predetermined neural network image perception models, performing corresponding adjustment to a current environmental image to obtain a plurality of current environmental feature images. — S101

By using the corresponding neural network image perception model, perceiving a perception target in each current environmental feature image to obtain a plurality of perception results. — S102

Fusing the plurality of perception results to obtain perception result data of the current environmental image. — S103

FIG.1

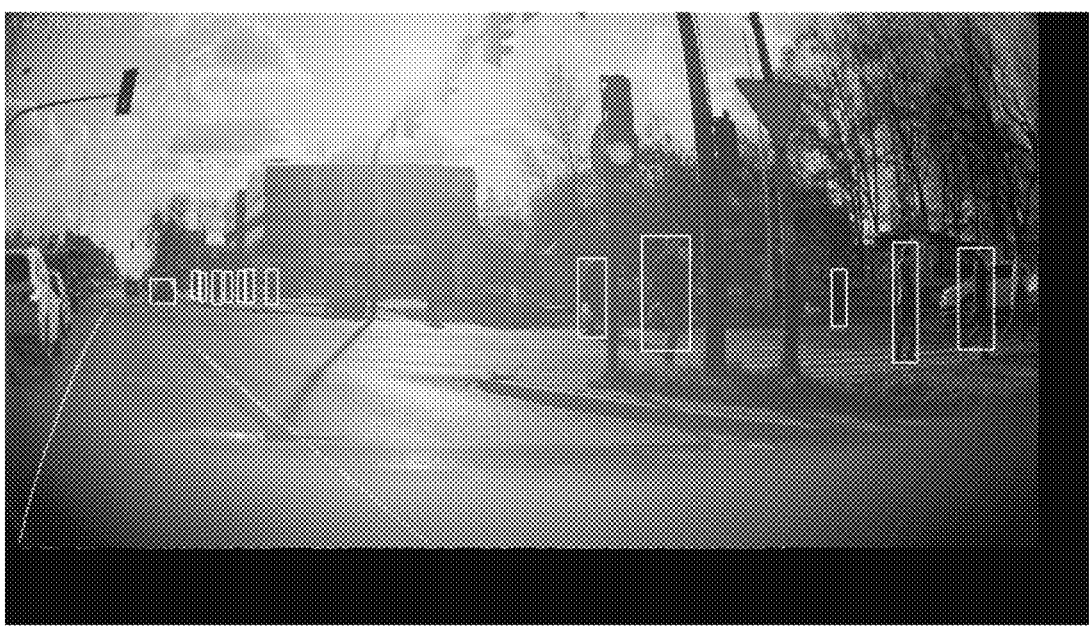

FIG.2

IMAGE PROCESSING METHOD AND APPARATUS, MEDIUM, DEVICE AND DRIVING SYSTEM

CROSS-REFERENCE TO RELATED APPLICATIONS

This application is a continuation of International Application No. PCT/CN2022/100666, filed on Jun. 23, 2022, which claims priority to Chinese Patent Application No. 202210185274.7, filed on Feb. 28, 2022. The disclosures of the aforementioned applications are hereby incorporated by reference in their entireties.

TECHNICAL FIELD

The present disclosure relates to the field of data processing technologies, and in particular to an image processing method and apparatus, a medium, a device and a driving system.

BACKGROUND

At present, image analysis and processing are applied more and more widely, for example, applied to positioning, recognition and tracking etc. of a target in a practical scenario. During image analysis and processing, it is required to obtain perception information by perceiving a target and then use the perception information to perform corresponding analysis and processing, where an accuracy of perceiving a target in an image directly affects an accuracy of a result of the image analysis and processing. Therefore, one set of accurate image target perception solution is needed.

SUMMARY

In order to address the problems in the prior arts, the present disclosure provides an image processing method and apparatus, a system, a medium, a device and a driving system, where segmentation is performed for a raw environmental image based on characteristics of different perception target classes and perception is performed using a corresponding perception model, and then perception results are fused to obtain a perception result of the raw environmental image so as to improve perception efficiency and accuracy.

According to a first aspect of embodiments of the present disclosure, there is provided an image processing method, including:

according to perception target features of each perception target feature class in a plurality of predetermined perception target feature classes, and a pixel requirement of a neural network image perception model corresponding to each perception target feature class in a plurality of predetermined neural network image perception models, performing corresponding adjustment to a current environmental image to obtain a plurality of current environmental feature images; by using the corresponding neural network image perception model, perceiving a perception target in each current environmental feature image to obtain a plurality of perception results, and, fusing the plurality of perception results to obtain perception result data of the current environmental image; where the plurality of perception target feature classes are in one-to-one correspondence with the plurality of neural network image perception models.

According to a second aspect of embodiments of the present disclosure, there is provided an image processing apparatus, including:

an image adjusting module, configured to, according to perception target features of each perception target feature class in a plurality of predetermined perception target feature classes, and a pixel requirement of a neural network image perception model corresponding to each perception target feature class in a plurality of predetermined neural network image perception models, perform corresponding adjustment to a current environmental image to obtain a plurality of current environmental feature images; a perceiving module, configured to, by using the corresponding neural network image perception model, perceive a perception target in each current environmental feature image to obtain a plurality of perception results, and, a fusing module, configured to fuse the plurality of perception results to obtain perception result data of the current environmental image; where the plurality of perception target feature classes are in one-to-one correspondence with the plurality of neural network image perception models.

According to a third aspect of embodiments of the present disclosure, there is provided a driving system, which includes the image processing apparatus in the above solution.

According to a fourth aspect of embodiments of the present disclosure, there is provided a computer readable storage medium, storing a computer instruction, where the computer instruction is executed to perform the image processing method in the above solution.

According to a fifth aspect of embodiments of the present disclosure, there is provided a computer device, including a processor and a memory, where the memory stores a computer instruction and the computer instruction is executed to perform the image processing method in the above solution.

The technical solution of the present disclosure can achieve the following beneficial effects: in the image processing method and apparatus, the system, the medium, the device and the driving system, segmentation is performed for a raw environmental image based on characteristics of different perception target classes and perception is performed using a corresponding perception model, and then perception results are fused to obtain a perception result of the raw environmental image so as to improve perception efficiency and accuracy.

BRIEF DESCRIPTION OF THE DRAWINGS

In order to more clearly describe the technical solution of the embodiments of the present disclosure, the accompanying drawings required for descriptions of the embodiments will be introduced briefly below. It is apparent that the accompanying drawings described below illustratively show some embodiments of the present disclosure.

FIG. 1 is a flowchart of a specific implementation of an image processing method according to the present disclosure.

FIG. 2 is a schematic diagram illustrating a current environmental image in a specific embodiment of an image processing method according to the present disclosure.

Figure 3:
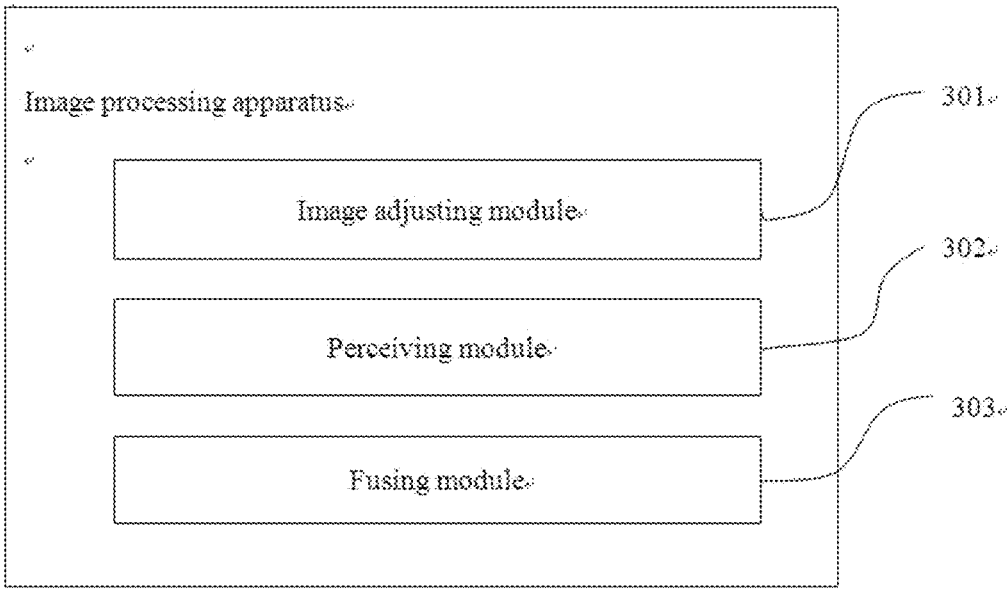
FIG. 3 is a schematic diagram illustrating a specific implementation of an image processing apparatus according to the present disclosure.

By the above drawings, definite embodiments of the present disclosure have been shown and more detailed descriptions will be made hereinafter. These drawings and descriptions are not intended to limit the idea of the present disclosure in any manner but illustrate the concept of the present disclosure for persons skilled in the art by referring to specific embodiments.

DETAILED DESCRIPTION OF THE EMBODIMENTS

In combination with the accompanying drawings, the preferred embodiments of the present disclosure will be elaborated below to make the advantages and features of the present disclosure easy to understand by those skilled in the art, so as to more clearly define the scope of protection of the present disclosure.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

At present, image analysis and processing are applied more and more widely, for example, applied to positioning, recognition and tracking etc. of a target in a practical scenario. During image analysis and processing, it is required to obtain perception information by perceiving a target and then use the perception information to perform corresponding analysis and processing, where an accuracy of perceiving a target in an image directly affects an accuracy of a result of the image analysis and processing. For example, in self-driving, perception is performed for objects such as an obstacle, and a lane line in an obtained environmental image and a vehicle running strategy is made based on perception results, thus a high accuracy of the perception results is required and otherwise potential traffic hazards may be present.

The present disclosure provides an image processing method and apparatus, a medium, a device and a driving system, where segmentation is performed for a raw environmental image based on characteristics of different perception target classes and perception is performed using a corresponding perception model, and then perception results are fused to obtain a perception result of the raw environmental image so as to improve perception efficiency and accuracy.

The technical solution of the present disclosure will be detailed below in combination with the specific embodiments and the accompanying drawings. The following specific embodiments may be mutually combined, with same or similar concepts or processes omitted in some embodiments.

FIG. 1 shows a specific implementation of an image processing method according to the present disclosure.

A specific implementation of the image processing method of the present disclosure shown in FIG. 1 includes: at step S101, according to perception target features of each perception target feature class in a plurality of predetermined perception target feature classes, and a pixel requirement of a neural network image perception model corresponding to each perception target feature class in a plurality of predetermined neural network image perception models, performing corresponding adjustment to a current environmental image to obtain a plurality of current environmental feature images; at step S102, by using the corresponding neural network image perception model, perceiving a perception target in each current environmental feature image to obtain a plurality of perception results; and at step S103, fusing the plurality of perception results to obtain perception result data of the current environmental image; where the plurality of perception target feature classes are in one-to-one correspondence with the plurality of neural network image perception models.

Segmentation is performed for a raw environmental image based on characteristics of different perception target classes and perception is performed using a corresponding perception model, and then perception results are fused to obtain a perception result of the raw environmental image so as to improve perception efficiency and accuracy.

The step S101 of, according to the perception target features of each perception target feature class in a plurality of predetermined perception target feature classes, and the pixel requirement of a neural network image perception model corresponding to each perception target feature class in a plurality of predetermined neural network image perception models, performing corresponding adjustment to the current environmental image to obtain a plurality of current environmental feature images can help use the corresponding neural network image perception model to perceive the corresponding current environmental feature image.

In an optional specific embodiment of the present disclosure, the above current environmental image is an environmental image which includes a plurality of perception feature classes and is collected by an image collection device. Specifically, the above current environmental image may be an environmental image which includes a plurality of perception feature classes and is collected by a camera disposed on a self-driving vehicle.

In a specific embodiment of the present disclosure, the above plurality of predetermined perception target feature classes are obtained by classifying the features of perceived targets in a scenario similar to the current environmental image.

In a specific embodiment of the present disclosure, the current environmental image is as shown in FIG. 2 and the above perception target feature classes include a first perception target feature class and a second perception target feature class, where the perceived targets in the first perception target feature class include obstacles, for example, moving obstacles such as persons and vehicles and a fixed obstacle such as road lamps and indication boards, which require a high sharpness favorable for perception. The second perception target feature class includes a lane line which requires low sharpness but high image integrity.

Optionally, the above first perception target feature class further includes a ground marking line, for example, a turning line.

Optionally, images taken by a camera at the time of the self-driving vehicle running on a road generally include targets to be perceived, such as pedestrians, vehicles, road lamps, indication signs and lane lines, where the pedestrians, the vehicles, the road lamps and the indication signs are classified into an obstacle class and the lane lines are classified into a lane line class.

In a specific embodiment of the present disclosure, based on the perception target features in each perception target feature class in the above plurality of perception target feature classes, an appropriate neural network image perception model is selected.

In a specific embodiment of the present disclosure, according to the perception target features of each perception target feature class in a plurality of predetermined perception target feature classes, and the pixel requirement of a neural network image perception model corresponding to each perception target feature class in a plurality of predetermined neural network image perception models, performing corresponding adjustment to the current environmental image to obtain a plurality of current environmental feature images includes:

According to an orientation of each perception target feature class in the current environmental image and a sharpness of each perception target feature class, determining a feature class portion of the corresponding current environmental feature image; according to a perception pixel upper limit of the neural network image perception model corresponding to each perception target feature class and a pixel of the current environmental image, determining a feature class pixel of the corresponding current environmental feature image; and, according to the feature class portion and the feature class pixel, adjusting the current environmental image to obtain the current environmental feature images. In this way, the perception accuracy can be guaranteed.

Specifically, when perception is performed for a perception target in an image, a portion of the orientation at which the corresponding perception target is located is naturally retained. Therefore, for example, an image collected by the image collection device on the vehicle shown in FIG. 2 includes the obstacle class such as pedestrians, vehicles, indication signs and road lamps, which are located at a middle upper portion of the image. Thus, in a preferred embodiment of the present disclosure, the middle upper portion of the image is determined as a feature class portion of the current environmental feature image of the obstacle class.

Further, the perception target feature classes with low sharpness, for example, the road markings, need to maintain, as possible, a sharpness sufficient to ensure the perception accuracy at the time of determining the corresponding feature class portion. Therefore, in a preferred embodiment of the present disclosure, for the perception target feature classes with low sharpness, the feature class portion is minimized.

When a feature class pixel of the current environmental feature image is determined based on the pixel of the current environmental image and the perception pixel upper limit of the corresponding neural network image perception model, the pixel of the current environmental feature image can be maximized to improve the perception accuracy.

In a specific embodiment of the present disclosure, a pixel of an image collected by the image collection device on the vehicle is 1920×1080, and a maximum pixel of an image perceivable by the neural network image perception model selected for the obstacle class is 1792×896, and a maximum pixel of an image perceivable by the neural network image perception model selected for the lane line class is 1024× 384. The feature class pixel of the current environmental feature image corresponding to the obstacle class is determined as 1792×896 and the feature class pixel of the current environmental feature image corresponding to the lane line class is determined as 1024×384.

In a specific embodiment of the present disclosure, according to the feature class portion and the feature class pixel, adjusting the current environmental image to obtain the current environmental feature images includes: performing cropping and/or scaling for the current environmental image with a pixel greater than the perception pixel upper limit of the neural network image perception model corresponding to each perception target feature class to obtain the current environmental feature images of the current environmental image.

Specifically, performing cropping and scaling is an effective approach to reduce image pixel. Therefore, whether to perform cropping or scaling or both of them can be determined based on a ratio of the portion of the perception target feature class to the portion of the current environmental image.

In a specific embodiment of the present disclosure, performing cropping and/or scaling for the current environmental image with the pixel greater than the perception pixel upper limit of the neural network image perception model corresponding to each perception target feature class to obtain the current environmental feature images of the current environmental image includes: performing cropping for the current environmental image to retain the sharpness of the perception target feature class, and then determining whether the pixel of the cropped current environmental image is greater than the perception pixel upper limit of the corresponding neural network image perception model; if yes, performing scaling for the cropped current environmental image, and if no, determining the cropped current environmental image as the current environmental feature image.

Specifically, in an actual scenario, during perception, a high sharpness of the obstacle class such as pedestrians, vehicles, indication boards and road lamps is required. Hence, preferably, the current environmental image of the obstacle class is firstly cropped, and then whether the pixel of the cropped current environmental image is greater than the perception pixel upper limit of the corresponding neural network image perception model is determined. If the pixel of the cropped current environmental image is greater than the perception pixel upper limit of the corresponding neural network image perception model, scaling is performed for the cropped current environmental image, and if not, the cropped current environmental image is determined as the current environmental feature image.

In a specific embodiment of the present disclosure, performing cropping and/or scaling for the current environmental image with the pixel greater than the perception pixel upper limit of the neural network image perception model corresponding to each perception target feature class to obtain the current environmental feature images of the current environmental image includes: firstly, performing scaling for the current environmental image to retain an integrity of the perception target feature class, and then determining whether the pixel of the scaled current environmental image is greater than the perception pixel upper limit of the corresponding neural network image perception model; if yes, performing cropping for the scaled current environmental image, and if no, determining the scaled current environmental image as the current environmental feature image.

Specifically, in an actual scenario, during perception, a low sharpness of the lane line class is required. Hence, preferably, scaling is firstly performed for the current environmental image of the lane line class and then whether the pixel of the scaled current environmental image is greater than the perception pixel upper limit of the corresponding neural network image perception model is determined. If the pixel of the scaled current environmental image is greater than the perception pixel upper limit of the corresponding neural network image perception model, cropping is performed for the scaled current environmental image, and otherwise, the scaled current environmental image is determined as the current environmental feature image.

In a specific embodiment of the present disclosure, after performing a perception process for a previous environmental feature image, each neural network image perception model performs perception for a corresponding current environmental feature image with a reception time closest to a current time in the current environmental feature images corresponding to the perception target feature classes.

Specifically, the selected neural network image perception model applied to this embodiment has a slow processing speed. Limited by the processing speed of the neural network image perception model, if perception is performed for each current environmental feature image, the perception real-timeness cannot be guaranteed. By passive frame loss, perception is performed only for the current environmental feature image with the reception time closest to the current time in the current environmental feature images of the perception target feature classes, so as to guarantee the perception real-timeness.

In the step S102 of, by using the corresponding neural network image perception model, perceiving a perception target in each current environmental feature image to obtain a plurality of perception results, high-accuracy perception results of different perception feature classes can be obtained.

In a specific embodiment of the present disclosure, by using the corresponding neural network image perception model, perceiving a perception target in each current environmental feature image to obtain a plurality of perception results includes: by using the corresponding neural network image perception model, perceiving perception targets in each current environmental feature image at the same time so as to improve the perception efficiency and save time.

In a specific embodiment of the present disclosure, the current environmental image is as shown in FIG. 2 and the current environmental feature images include a first environmental feature image corresponding to the first perception target feature class and a second environmental feature image corresponding to the second perception target feature class, where the first environmental feature image includes perception targets for example, obstacles such as persons, vehicles, indication boards and road lamps; the second environmental feature image includes perception targets such as lane lines; the first perception target feature class corresponds to an obstacle perception model and the second perception target feature class corresponds to a lane line perception model.

In this embodiment, by using the corresponding neural network image perception model, perceiving a perception target in each current environmental feature image to obtain a plurality of perception results includes: firstly, by using the obstacle perception model, performing perception for the first environmental feature image and then by using the lane line perception model, performing perception for the second environmental feature image; firstly by using the lane line perception model, performing perception for the second environmental feature image and then by using the obstacle perception model, performing perception for the first environmental feature image; or, performing simultaneous perception for the first environmental feature image and the second environmental feature image by using the obstacle perception model and the lane line perception model.

In the step S103 of fusing the plurality of perception results to obtain perception result data of the current environmental image, the perception target information of the same images is fused with the images and a correspondence between the perception target information and the corresponding images is established, so as to ensure the accuracy of the perception results.

In an optional specific embodiment of the present disclosure, fusing the plurality of perception results to obtain the perception result data of the current environmental image includes: associating the perception target information in the plurality of perception results with corresponding pixel positions of the current environmental image to obtain the perception result data of the current environmental image. In this way, the positions of the perception targets in the current environmental image can be determined clearly such that analysis and determination can be conducted based on them.

In a specific embodiment of the present disclosure, the image processing method in the present disclosure may further include: transmitting the perception result data to a PC end via an Ethernet in real time, and based on the perception result data, highlighting, at the PC end, the perception targets of the current environmental image in the current environmental image. Thus, the perception targets of the current environmental image can be highlighted in real time in the current environmental image, so as to visually monitor, in real time, whether the perception results of the perception target information are accurate, further ensuring the perception accuracy.

In an optional specific embodiment of the present disclosure, the steps S101 to S103 are all carried out on an embedded development board. One port (IP address) is bound on the embedded development board and the PC respectively, where the port on the embedded development board serves as a transmitting port and the port on the PC serves as a receiving port. After the two ports are connected, the port of the PC end may perform monitoring. After the above perception result data is obtained, the perception result data is transmitted via the Ethernet. The port of the PC end monitors and receives the above perception result data. In this way, the perception targets in the current environmental image are highlighted in real time in the current environmental image based on the above result data at the PC end.

Optionally, highlighting the perception targets of the current environmental image in the current environmental image includes: using a box around an image of the perception targets in the above current environmental image to highlight the perception target.

Optionally, highlighting the perception targets of the current environmental image in the current environmental image includes: thickening the contour of the perception targets in the above environmental image to achieve highlighting.

In a specific embodiment of the present disclosure, the above PC end, after receiving the above perception result data, stores the perception result data in the format of Json file.

FIG. 3 shows a specific implementation of an image processing apparatus according to the present disclosure.

The specific implementation of the image processing apparatus shown in FIG. 3 according to the present disclosure includes:

an image adjusting module 301, configured to, according to perception target features of each perception target feature class in a plurality of predetermined perception target feature classes, and a pixel requirement of a neural network image perception model corresponding to each perception target feature class in a plurality of predetermined neural network image perception models, perform corresponding adjustment to a current environmental image to obtain a plurality of current environmental feature images; a perceiving module 302, configured to, by using the corresponding neural network image perception model, perceive a perception target in each current environmental feature image to obtain a plurality of perception results; and, a fusing module 303, configured to fuse the plurality of perception results to obtain perception result data of the current environmental image; where the plurality of perception target feature classes are in one-to-one correspondence with the plurality of neural network image perception models.

The apparatus of the present disclosure can perform segmentation for a raw environmental image based on characteristics of different perception target classes, perform perception by using a corresponding perception model and then fuse the perception results to obtain a perception result of the raw environmental image, so as to improve the perception efficiency and accuracy.

The image adjusting module 201, configured to, according to the perception target features of each perception target feature class in a plurality of predetermined perception target feature classes, and the pixel requirement of the neural network image perception model corresponding to each perception target feature class in a plurality of predetermined neural network image perception models, perform corresponding adjustment to the current environmental image to obtain a plurality of current environmental feature images, can obtain the current environmental feature images and perform perception for the corresponding current environmental feature image using the corresponding neural network image perception model.

The perceiving module 202, configured to, by using the corresponding neural network image perception model, perceive a perception target in each current environmental feature image to obtain a plurality of perception results, can obtain high-accuracy perception results of different perception feature classes.

The fusing module 203, configured to fuse the plurality of perception results to obtain the perception result data of the current environmental image, can fuse the perception target information of the same images with the images and establish a correspondence between the perception target information and the corresponding images to ensure the perception result accuracy.

In a specific embodiment of the present disclosure, the image processing apparatus of the present disclosure may further include a transmission displaying module, configured to transmit the perception result data to the PC end via an Ethernet in real time and based on the perception result data, highlight, at the PC end, the perception targets of the current environmental image in the current environmental image. Thus, the transmission displaying module can highlight the perception targets of the current environmental image in the current environmental image, so as to visually monitor, in real time, whether the perception target information is accurate, ensuring the perception accuracy.

The image processing apparatus provided by the present disclosure can be applied to perform the image processing method according to any one of the above embodiments, and its implementation principle and technical effects are similar to the method and thus will not be repeated herein.

In a specific embodiment of the present disclosure, the functional modules of the image processing apparatus of the present disclosure may be located directly in a hardware or in a software module executable by a processor or in a combination thereof.

The software module may reside in Random Access Memory (RAM), flash memory, Read Only Memory (ROM), Erasable Programmable Read-Only Memory (EPROM), Electrically Erasable Programmable read only memory (EEPROM), register, hard drive, removable disk, CD-ROM or any other type of storage mediums known in the technology. An exemplary storage medium is coupled to a processor to enable the processor to read information from and write information into the storage medium.

The processor may be a central processing unit (CPU), or a general-purpose processor, a digital signal processor (DSP), an application specific integrated circuit (ASIC), a field programmable gate array (FPGA) or any other programmable logic apparatus, discrete gate or transistor logic, discrete hardware assembly or any combinations thereof or the like. The general-purpose processor may be a microprocessor and in an alternative solution, the processor may also be any conventional processor, controller, microcontroller or state machine. The processor may be also be implemented as a combination of computing apparatuses, for example, a combination of DSP and microprocessor, multiple microprocessors, one or more microprocessors combining the DSP core or any other such configurations. In an alternative solution, the storage medium and the processor may be integrated together. The processor and the storage medium may reside in the ASIC. The ASIC may reside in a user terminal. In an alternative solution, the processor and the storage medium may reside as a discrete assembly in the user terminal.

In another technical solution of the present disclosure, there is provided a driving system, including an image processing apparatus. Optionally, the image processing apparatus includes a processor and a memory, which are coupled with each other. The image processing apparatus performs the image processing method of the above solutions.

In another specific embodiment of the present disclosure, there is provided a computer readable storage medium storing a computer instruction, where the computer instruction is executed to perform the image processing method as mentioned above.

In another specific embodiment of the present disclosure, there is provided a computer device including a processor and a memory, where the memory stores a computer instruction which is executed to perform the image processing method as mentioned above.

In several embodiments of the present disclosure, it should be understood that the disclosed apparatus and method may be implemented in another manner. For example, the apparatus embodiments described above are only illustrative, for example, the unit division is only a logic function division and may be carried out in another manner in an actual implementation. For example, multiple units or assemblies may be combined or integrated into another system or some features may be omitted or not executed.

Further, the mutual couplings or direct couplings or communication connections displayed or discussed may be performed through some interfaces and the direct couplings or communication connections between apparatuses or units may be electrical, or mechanical or in other form.

Units described as separate members may be or not be physically separated and the components displayed as units may be or not be physical units, i.e. may be located in one place or distributed to multiple network units. All or some of the units may be selected based on actual requirements to achieve the purpose of the solutions of the present disclosure.

The above descriptions are made only to preferred embodiments of the present disclosure and not to limit the scope of protection of the present disclosure. Any equivalent structure transformations made using the specification and the drawings of the present disclosure or direct or indirect application to other relevant technical fields shall all be incorporated in the scope of protection of the present disclosure.

What is claimed is:

1. An image processing method, comprising:
according to perception target features of each perception target feature class in a plurality of predetermined perception target feature classes, and a pixel requirement of a neural network image perception model corresponding to each perception target feature class in a plurality of predetermined neural network image perception models, performing corresponding adjustment to a current environmental image to obtain a plurality of current environmental feature images;
by using the corresponding neural network image perception model, perceiving a perception target in each current environmental feature image to obtain a plurality of perception results, and,
fusing the plurality of perception results to obtain perception result data of the current environmental image;
wherein the plurality of perception target feature classes are in one-to-one correspondence with the plurality of neural network image perception models;
wherein according to the perception target features of each perception target feature class in a plurality of predetermined perception target feature classes, and the pixel requirement of a neural network image perception model corresponding to each perception target feature class in a plurality of predetermined neural network image perception models, performing corresponding adjustment to the current environmental image to obtain a plurality of current environmental feature images comprises:
according to an orientation of each perception target feature class in the current environmental image and a sharpness of each perception target feature class, determining a feature class portion of the corresponding current environmental feature image;
according to a perception pixel upper limit of the neural network image perception model corresponding to each perception target feature class and a pixel of the current environmental image, determining a feature class pixel of the corresponding current environmental feature image; and,
according to the feature class portion and the feature class pixel, adjusting the current environmental image to obtain the current environmental feature images.

2. The image processing method of claim 1, wherein according to the feature class portion and the feature class pixel, adjusting the current environmental image to obtain the current environmental feature images comprises:
performing cropping and/or scaling for the current environmental image with a pixel greater than the perception pixel upper limit of the neural network image perception model corresponding to each perception target feature class to obtain the current environmental feature images of the current environmental image.

3. The image processing method of claim 2, wherein performing cropping and/or scaling for the current environmental image with the pixel greater than the perception pixel upper limit of the neural network image perception model corresponding to each perception target feature class to obtain the current environmental feature images of the current environmental image comprises:
performing cropping for the current environmental image to retain the sharpness of the perception target feature class, and then determining whether the pixel of the cropped current environmental image is greater than the perception pixel upper limit of the corresponding neural network image perception model; if yes, performing scaling for the cropped current environmental image, and if no, determining the cropped current environmental image as the current environmental feature image; or,
firstly, performing scaling for the current environmental image to retain an integrity of the perception target feature class, and then determining whether the pixel of the scaled current environmental image is greater than the perception pixel upper limit of the corresponding neural network image perception model; if yes, performing cropping for the scaled current environmental image, and if no, determining the scaled current environmental image as the current environmental feature image.

4. The image processing method of claim 1, wherein fusing the plurality of perception results to obtain the perception result data of the current environmental image comprises:
associating perception target information in the plurality of perception results with corresponding pixel positions of the current environmental image to obtain the perception result data of the current environmental image.

5. The image processing method of claim 1, wherein,
the plurality of perception target feature classes comprise a first perception target feature class and a second perception target feature class, a perception target in the first perception target feature class comprises an obstacle, and the second perception target feature class comprises a lane line;
the plurality of neural network image perception models comprise an obstacle perception model corresponding to the first perception target feature class and a lane line perception model corresponding to the second perception target feature class.

6. An image processing apparatus, comprising:
one or more processors, and a non-transitory storage medium in communication with the one or more processors, the non-transitory storage medium configured to store program instructions, wherein, when executed by the one or more processors, the instructions cause the apparatus to perform steps of:
performing corresponding adjustment to a current environmental image to obtain a plurality of current environmental feature images, according to perception target features of each perception target feature class in a plurality of predetermined perception target feature classes, and a pixel requirement of a neural network image perception model corresponding to each perception target feature class in a plurality of predetermined neural network image perception models;

perceiving a perception target in each current environmental feature image to obtain a plurality of perception results, by using the corresponding neural network image perception model, and, fusing the plurality of perception results to obtain perception result data of the current environmental image;

wherein the plurality of perception target feature classes are in one-to-one correspondence with the plurality of neural network image perception models;

wherein according to the perception target features of each perception target feature class in a plurality of predetermined perception target feature classes, and the pixel requirement of a neural network image perception model corresponding to each perception target feature class in a plurality of predetermined neural network image perception models, performing corresponding adjustment to the current environmental image to obtain a plurality of current environmental feature images comprises:

according to an orientation of each perception target feature class in the current environmental image and a sharpness of each perception target feature class, determining a feature class portion of the corresponding current environmental feature image;

according to a perception pixel upper limit of the neural network image perception model corresponding to each perception target feature class and a pixel of the current environmental image, determining a feature class pixel of the corresponding current environmental feature image; and, according to the feature class portion and the feature class pixel, adjusting the current environmental image to obtain the current environmental feature images.

7. The image processing apparatus of claim 6, wherein according to the feature class portion and the feature class pixel, adjusting the current environmental image to obtain the current environmental feature images comprises:

performing cropping and/or scaling for the current environmental image with a pixel greater than the perception pixel upper limit of the neural network image perception model corresponding to each perception target feature class to obtain the current environmental feature images of the current environmental image.

8. The image processing apparatus of claim 7, wherein performing cropping and/or scaling for the current environmental image with the pixel greater than the perception pixel upper limit of the neural network image perception model corresponding to each perception target feature class to obtain the current environmental feature images of the current environmental image comprises:

performing cropping for the current environmental image to retain the sharpness of the perception target feature class, and then determining whether the pixel of the cropped current environmental image is greater than the perception pixel upper limit of the corresponding neural network image perception model; if yes, performing scaling for the cropped current environmental image, and if no, determining the cropped current environmental image as the current environmental feature image; or, firstly, performing scaling for the current environmental image to retain an integrity of the perception target feature class, and then determining whether the pixel of the scaled current environmental image is greater than the perception pixel upper limit of the corresponding neural network image perception model; if yes, performing cropping for the scaled current environmental image, and if no, determining the scaled current environmental image as the current environmental feature image.

9. The image processing apparatus of claim 6, wherein fusing the plurality of perception results to obtain the perception result data of the current environmental image comprises:

associating perception target information in the plurality of perception results with corresponding pixel positions of the current environmental image to obtain the perception result data of the current environmental image.

10. The image processing apparatus of claim 6, wherein, the plurality of perception target feature classes comprise a first perception target feature class and a second perception target feature class, a perception target in the first perception target feature class comprises an obstacle, and the second perception target feature class comprises a lane line;

the plurality of neural network image perception models comprise an obstacle perception model corresponding to the first perception target feature class and a lane line perception model corresponding to the second perception target feature class.

11. A non-transitory computer readable storage medium, storing a computer instruction wherein the computer instruction is executed to enable a computer to perform the image processing method, which comprises:

according to perception target features of each perception target feature class in a plurality of predetermined perception target feature classes, and a pixel requirement of a neural network image perception model corresponding to each perception target feature class in a plurality of predetermined neural network image perception models, performing corresponding adjustment to a current environmental image to obtain a plurality of current environmental feature images;

by using the corresponding neural network image perception model, perceiving a perception target in each current environmental feature image to obtain a plurality of perception results, and, fusing the plurality of perception results to obtain perception result data of the current environmental image;

wherein the plurality of perception target feature classes are in one-to-one correspondence with the plurality of neural network image perception models;

wherein according to the perception target features of each perception target feature class in a plurality of predetermined perception target feature classes, and the pixel requirement of a neural network image perception model corresponding to each perception target feature class in a plurality of predetermined neural network image perception models, performing corresponding adjustment to the current environmental image to obtain a plurality of current environmental feature images comprises:

according to an orientation of each perception target feature class in the current environmental image and a sharpness of each perception target feature class, determining a feature class portion of the corresponding current environmental feature image;

according to a perception pixel upper limit of the neural network image perception model corresponding to each perception target feature class and a pixel of the current environmental image, determining a feature class pixel of the corresponding current environmental feature image; and, according to the feature class portion and the feature class pixel, adjusting the current environmental image to obtain the current environmental feature images.

* * * * *